US006860495B2

(12) United States Patent
Williamson

(10) Patent No.: US 6,860,495 B2
(45) Date of Patent: Mar. 1, 2005

(54) PATIENT CARRIER WITH STORAGE

(76) Inventor: William P. Williamson, 7513 State Hwy. 243, Kaufman, TX (US) 75142

( * ) Notice: Subject to any disclaimer, the term of this patent is extended or adjusted under 35 U.S.C. 154(b) by 0 days.

(21) Appl. No.: 10/133,886

(22) Filed: Apr. 29, 2002

(65) Prior Publication Data

US 2002/0171215 A1 Nov. 21, 2002

Related U.S. Application Data

(63) Continuation-in-part of application No. 09/850,517, filed on May 7, 2001, now abandoned.

(51) Int. Cl.[7] .......................... B62B 7/00; B61H 13/00; B60R 7/00

(52) U.S. Cl. ................ 280/47.38; 280/47.4; 280/304.1; 280/304.5; 180/907; 188/2 F; 224/275

(58) Field of Search .......................... 280/304.1, 304.3, 280/304.5, 650, 47.38, 47.35, 47.4, 250.1, 33.994; 180/907; 188/57, 29, 19, 2 F, 2 D; 224/42.32, 275, 273; 296/20; 5/81.1 R

(56) References Cited

U.S. PATENT DOCUMENTS

| | | | | | |
|---|---|---|---|---|---|
| 78,472 | A | * | 6/1868 | Neuhaus | 297/423.12 |
| 2,812,041 | A | * | 11/1957 | Mugler | 280/33.994 |
| 4,696,420 | A | * | 9/1987 | Kulik | 224/275 |
| 5,028,065 | A | * | 7/1991 | Danecker | 280/250.1 |
| 5,135,191 | A | * | 8/1992 | Schmuhl | 248/125 |
| 5,230,524 | A | * | 7/1993 | Jackson | 280/47.38 |
| 5,370,408 | A | * | 12/1994 | Eagan | 280/33.994 |
| 5,984,334 | A | * | 11/1999 | Dugas | 280/250.1 |
| 6,154,690 | A | * | 11/2000 | Coleman | 701/1 |

* cited by examiner

*Primary Examiner*—Christopher P. Ellis
*Assistant Examiner*—G B Klebe

(57) ABSTRACT

A carrier to transport a person in sitting position along with luggage, miscellaneous small articles and, when needed a gas cylinder and a holder to drip feed a patient. The carrier with a manually operable fail safe brake and foot rests that are tilted up and foldable whereby one being transported cannot stand on the foot rests and tip the unit but folds the foot rests to allow standing on the floor. The carrier may be stored in a normal cart space and is suitable for use in hospitals, airports etc.

1 Claim, 5 Drawing Sheets

PATIENT CARRIER WITH STORAGE

This is a C.I.P of Ser. No. 09/850,517 filed May 7, 2001, now abandoned for a patient carrier. There are many various types of patient carriers or wheelchairs with only a few having desirable transport storage. Objectives of our present invention include a patient carrier

- that meets all standards in the Safe Medical Devices Act
- that has a streamlined attractive appearance
- that has rotating foot rests to reduce storage space
- that has easily installed leg rests
- that has a fail safe braking system
- that has all plastic easily sanitized surface
- that may be easily pushed over minor floor irregularities
- that has minimal turning radius
- that occupies minimal storage space
- that provides for readily useable space for suitcase or similar article transportation
- that provides for safe transportation of oxygen bottles
- that provides for in use transport of patient “drip tubes”
- that is of rugged construction of long lasting material
- that may be readily pushed and guided
- that protects a patients legs during transport
- that meets the Federal Ergonomic Standards
- that has advertising space on each side We have found no other similar vehicles in the prior art that have all these desirable features.

BACKGROUND OF THE INVENTION

The closest prior art we find is U.S. Pat. No. 5,230,524, issued to Jackson on Jul. 27, 1993. Improvements in our present invention include:

- fail safe manually operated wheel brakes
- ten degree angled foot rests to prevent a patient from trying to stand and thereby tipping the vehicle
- a holder for an oxygen cylinder or flower pots
- two holders for drip bags or hanging clothes
- greater manuverability over slight obstructions
- increased tray and under seat storage space
- a quick connect leg rest for orthopedic use
- improved sanitation by elimination of seat cushions
- simplified assembly by molding in two major pieces that are assembled with six bolts.

SUMMARY OF THE INVENTION

The invention encompasses an improved patient carrier that may be used equally well in hospitals for transporting patients in a seated position or in an air port or hotel for transporting luggage with people who desire assistance in both walking and/or moving luggage. Unique features include a one piece molded body that is bolted to a one piece base; luggage carrying space, openings for safe transportation of an oxygen cylinder or other matter, a rotating angled foot rest that both prevents a user from standing up on the foot rests and tipping the unit and rotates under the vehicle to shorten the unit for storage in conventional wheelchair or cart storage space; and a fail safe braking system that requires manual pressure continuously to allow movement of the unit.

DETAILED DESCRIPTION OF THE INVENTION

The patent may best be described from the drawings.

Figure 1:
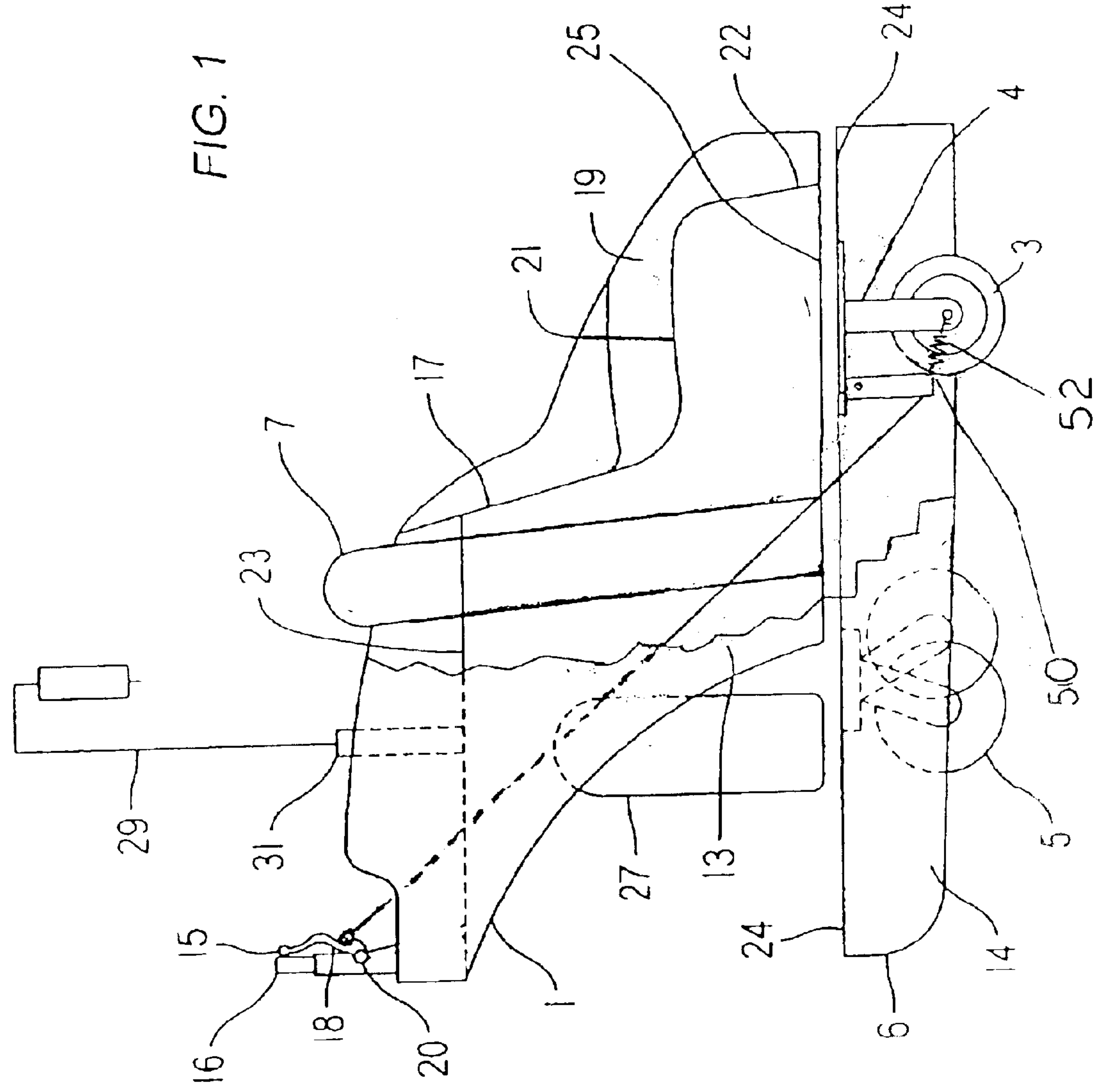
FIG. 1 shows a cut a way side view to show shape and details of construction.
Figure 3:
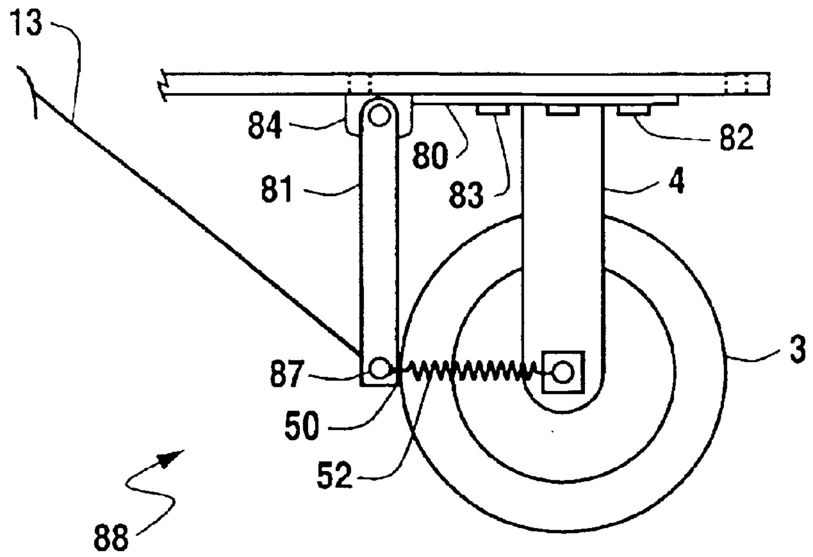
FIG. 3 shows details of construction of the brake on each of the front wheels

FIG. 1 shows the overall unit or patient carrier. The unit is rotationally molded in essentially two major pieces. The lower piece or lower platform 6 has a rectangular shape with a flat top 24 and a skirt 14. A pair of fixed front wheels 3 each has base 4 of each wheel bolted to the underside of top 24. Brake face 50, shown in more detail in FIG. 3, is spring loaded with spring 52, FIG. 3 to immobilize the unit until spring loaded lever 15 is manually depressed to actuate connector wire 13 to to pull brake face 50 away from wheels 3. Many other brakes are useable but after our field research this is most reliable and we rate it as the best. A pair of caster wheels 5 are centrally pivotally attached to the underside of top 24 to allow the unit to have a very short turning radius.

Figure 2:
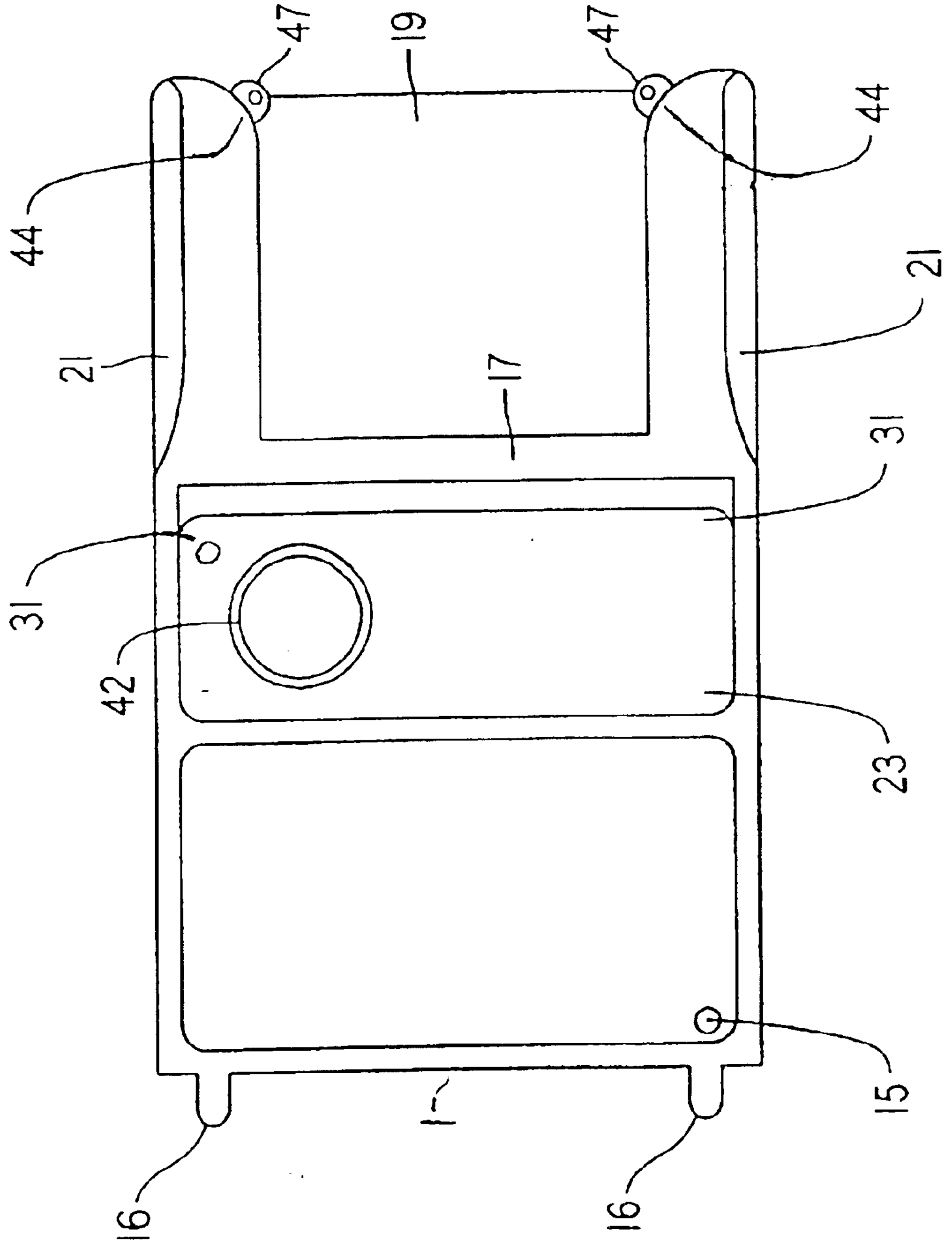
FIG. 2 shows a top view

The second major piece is an upper chair like unit 1 that is rotationally molded in one piece and has two sides and integrally molded a seat 19, a seat back 17, a seat skirt 22, a support base 25, and attached to said seatback, a tray 23 with an opening 42 shown in FIG. 2, a rod support holder 31 and dual push and guide handles 16. Seat cushions have been eliminated as plastic surfaces are easier to maintain clean. Shown in the cut-a-way portion, indicated by the number 13 of FIG. 1 is a cylinder 7 as it would be carried in the unit. The opening for the cylinder is also quite useful to carry other objects such as a flower pot. Also shown is a drip support rod 29 for use when needed or is a clothes hanging rod and is normally with the unit and clips (not shown) on the underside of tray 23 to store these rods when necessary. A suitcase 27 is shown to indicate storage on the lower shelf and under the seat. The upper major piece or unit 1 may be fastened to the lower piece or unit 6 in any of several ways but preferred fastening is with six bolts. The two piece construction is a major advantage in simplifying assembly of the overall patient carriage.

Dual guide and push handles 16 have one brake lever 15 pivoted at point 20 and spring loaded 18 to hold brake face 50 to immobilize the front wheels unless the brake lever 15 is held in the depressed position. The braking system is shown in more detail in FIGS. 3, 4, and 5.

FIG. 2 shows the top view of the patient cart or carrier indicating relative sizes and location of component parts. The unit 1 may be guided and moved by an attendant by depressing brake lever 15 and using vertical handles 16. Drip support holder 31 may be a short segment of aluminum or stainless pipe. Opening 42 may be used to hold a gas cylinder in a safe upright position; most frequent use is for an oxygen cylinder or flower pots. Arms 21 are integrally formed with seat 19 and seat back 17. Openings 44 in dual brackets 47 on each side of the unit hold angled rotatable foot rests as discussed under FIG. 6.

FIG. 3 shows details of the fail safe brakes that are on each front wheel. Brake face 50 is the leading edge of a flat connecting piece of flat rotatable brake arms 81 on either side of the unit and fits against wheels 3. Brake arm 81 rotatably mount to tab 84 on mounting bracket 80. The U-shaped flat metal mounting bracket 80 mounts with screws 82 and 83 going through each arm under bases 4 for front wheels 3. The Brake spring 52, which requires 5–10 pounds extensible force hooks to a clip on the axle for wheels 3 and into openings 87 in brake 88. Wire 13 runs through the unit from brake bar 86 shown in FIG. 5 to lever 15 which must be depressed to pull brake face 50 away from wheels 3 to allow movement of the unit.

Figure 4:
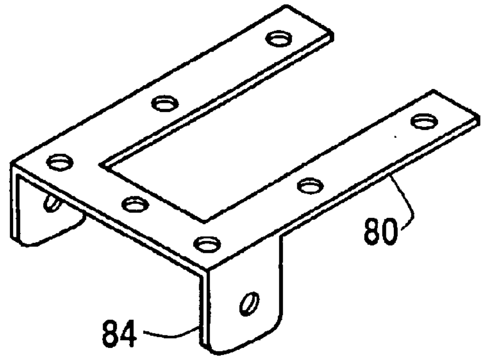
FIG. 4 shows details of the brake mounting bracket
Figure 5:
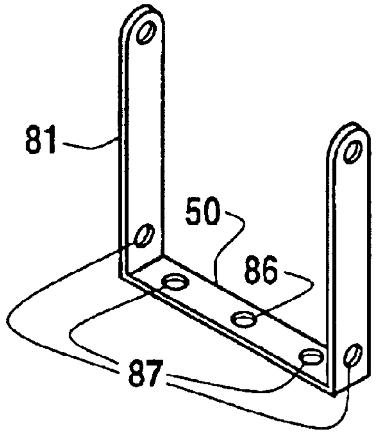
FIG. 5 shows details of the brake

FIG. 4 shows mounting bracket 80 with tabs 84 for mounting rotatable brake arms 81 shown in FIG. 5.

FIG. 5 shows braking face 50 which is the leading edge brake bar 86 which is the flat connector piece connecting dual arms 81. Openings 87 allow hooking in beginning ends of springs 52 on either side of the unit. Pull wire 13 hooks to the center of brake bar 86 and connects to through a normal cable sheath to lever 15, FIG. 1.

Figure 6:
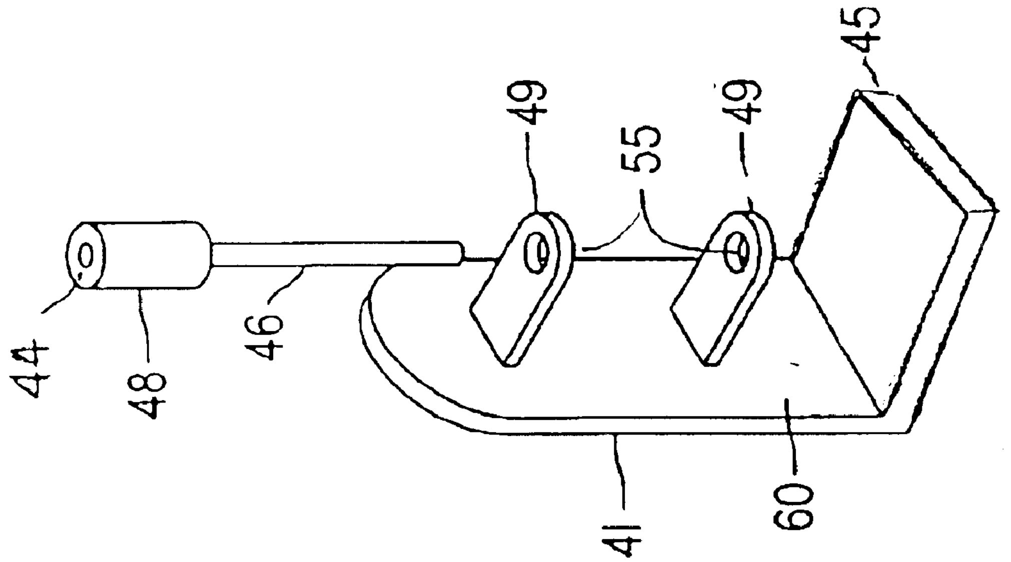
FIG. 6 shows one of two foot rests with a pin fastener that is also a removable leg rest holder.

FIG. 6 shows the rotatable foot rest unit 41 with the angled footpad 45 and with brackets 49 that slides between brackets 47, and FIG. 2 allowing pin 46 with leg rest holder 48 to drop through top opening 55 as shown and through bottom opening 55 as shown. Panel 60 is the support panel for the foot rest unit 41. Foot pad 45 is angled upward at 10 degrees to allow resting a foot but to prevent a person in the conveyance from standing thereon. When a person in the conveyance wishes to stand the footpad 45 swings under the seat skirt 22, FIG. 1 and the leg protector 62, FIG. 7, swings back against the seat skirt under seai 19. This arrangement allows a user to step out on a solid floor and also allows shortening the unit for storage.

Figure 7:
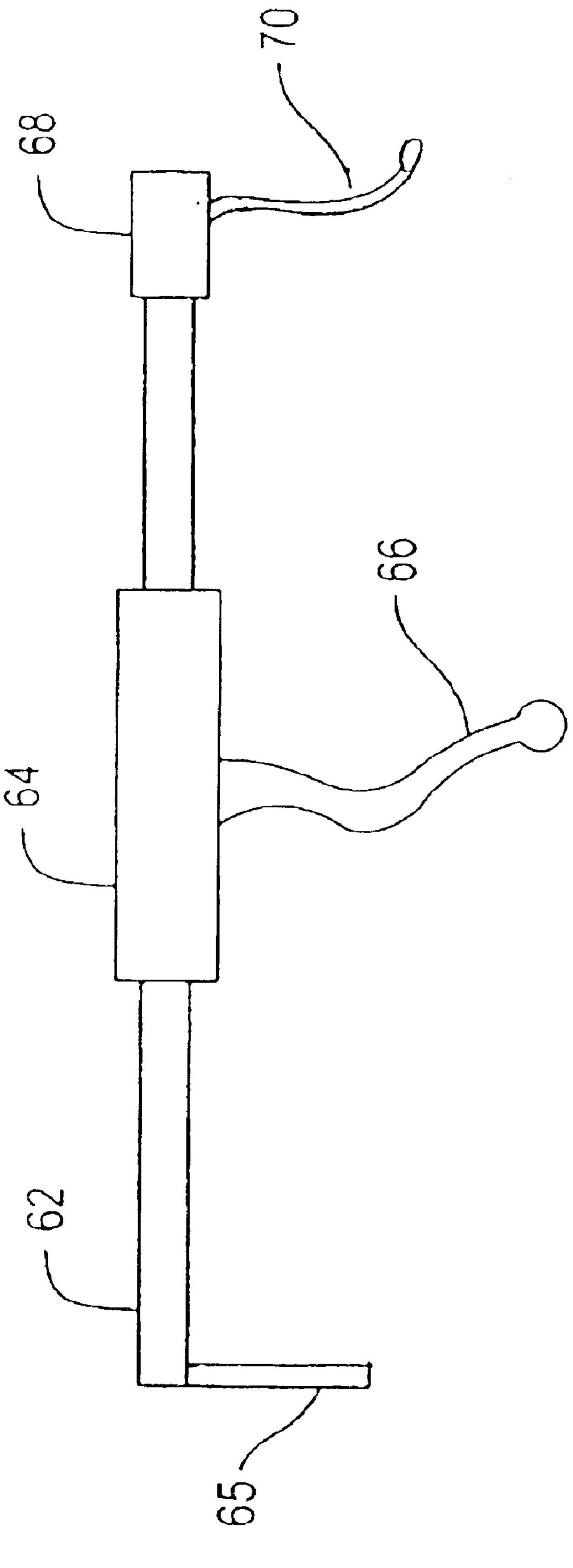
FIG. 7 shows a quick connect removable leg rest.

FIG. 7 shows a removable leg rest device 62 with the cylindrical fastening pin 65 that drops into opening 44, FIG. 6 to removably hold the leg rest device at the proper in use position. A slightly dished leg calf support 64 is equipped with a strap 66 and VELCRO hook and loop fasteners and with a dished heel support 68 with heel support strap 70 with similar fasteners.

What is claimed is:

1. A Patient Carrier comprising: a lower platform with a skirt around said lower platform; wheels attached one on each side of the underside of said lower platform; a fail safe brake means on each of said wheels comprising:

a U-shaped flat metal mounting bracket with each arm of said bracket mounted under each front wheel and with a mounting tab on each side of a base of said U-shaped mounting bracket:

a flat metal brake bar with flat arms to rotatably mount to said mounting tabs;

springs requiring five to ten pounds extensible force hooked between front wheel axle clips and said flat metal brake bar, a brake lever next to one of push and guide handles of said patient carrier and a wire connection between said brake lever and a center point of said brake bar to require depression of said brake bar lever to allow movement of said front wheels;

a pair of wheels attached opposite each other in a unit with said unit attached to a central pivot point in a spot under a rearward end of said lower platform to allow said wheels to pivot 360 degrees under a said skirt attached to said lower platform;

a rectangular one piece upper platform comprising dual sides connecting to a lower base and connecting on forward end with a seating shape with seat arms and a seat back, with said seat back connecting with an upper tray with an opening therein and forming the upper portion of said rectangular one piece upper platform and with said tray having said push and guide handles on a rearward edge of said tray, with said lower base of said rectangular one piece upper platform connected to said lower platform, a pair of rotatable foot rest units with one of each of said pair of rotatable foot rest units connected in each of a pair of brackets located on each of said sides in front of and adjacent to said bottom end of said skirt attached to said lower platform, each of said brackets having a pin means to rotatably hold each of said pair of foot rest units with each of said pair of foot rest units having foot pads angled upward at about 10 degrees to allow said footpads to go under said seat and to rest against said skirt below said seat, a pair of leg rest devices with each of said devices having a cylindrical support pin with said support pins rotatably fitting into openings in said pin means to hold each of said leg rest devices, a round opening in said forward end of said upper platform to allow carrying a cylinder in an upright position and supported on said lower platform, a cylindrical holder in said upper platform to allow removably holding a support for a drip bottle to allow continuous injection to a patient during transport.

* * * * *